(12) United States Patent
Malkvist

(10) Patent No.: US 6,474,358 B1
(45) Date of Patent: Nov. 5, 2002

(54) FIRE HYDRANT SAFETY BOX

(76) Inventor: Sigge Malkvist, 4540 Kearney Villa Rd #202, San Diego, CA (US) 92123

( * ) Notice: Subject to any disclaimer, the term of this patent is extended or adjusted under 35 U.S.C. 154(b) by 0 days.

(21) Appl. No.: 10/014,211

(22) Filed: Nov. 9, 2001

(51) Int. Cl.[7] .......................... E03B 9/06; F16K 27/06; F16K 27/12
(52) U.S. Cl. ..................... 137/296; 137/364; 137/371
(58) Field of Search ................... 137/272, 294, 137/296, 364, 368, 369, 370, 371, 382

(56) References Cited

U.S. PATENT DOCUMENTS

| 565,013 | A | | 8/1896 | Moodie | |
|---|---|---|---|---|---|
| 1,086,841 | A | * | 2/1914 | Mueller | 137/296 |
| 1,600,761 | A | * | 9/1926 | Haase | 137/364 |
| 2,564,226 | A | * | 8/1951 | Norway | 137/364 |
| 2,718,238 | A | * | 9/1955 | Simko | 137/364 |
| 2,869,576 | A | * | 1/1959 | Kennedy | 137/296 |
| 3,961,528 | A | * | 6/1976 | Ford | 137/364 |
| 4,556,080 | A | | 12/1985 | Picaud | |
| 4,890,638 | A | | 1/1990 | Davenport | |
| D352,660 | S | | 11/1994 | Stirbiak | |
| 5,520,210 | A | | 5/1996 | Barton | |
| 5,664,597 | A | | 9/1997 | Miskiewicz | |
| 5,983,925 | A | * | 11/1999 | Miller | 137/364 |
| 6,035,887 | A | * | 3/2000 | Cato | 137/364 |
| 6,116,813 | A | * | 9/2000 | Pate | 137/364 |

FOREIGN PATENT DOCUMENTS

| DE | 692547 | * | 6/1940 | 137/296 |
|---|---|---|---|---|
| DE | 813525 | * | 9/1951 | 137/296 |

* cited by examiner

Primary Examiner—George L. Walton

(57) ABSTRACT

A fire hydrant safety box provides a user with a product that could be used to surround and protect fire hydrants from physical damage. The fire hydrant safety box includes a tubular member has an upper edge, a lower edge and a peripheral wall that extends between the upper and lower edge. The upper edge defines an upper opening and the lower edge defines a lower opening. The fire hydrant is extended through the lower opening such that the fire hydrant is within the tubular member. The lower edge extends into a ground surface for surrounding the fire hydrant.

10 Claims, 2 Drawing Sheets

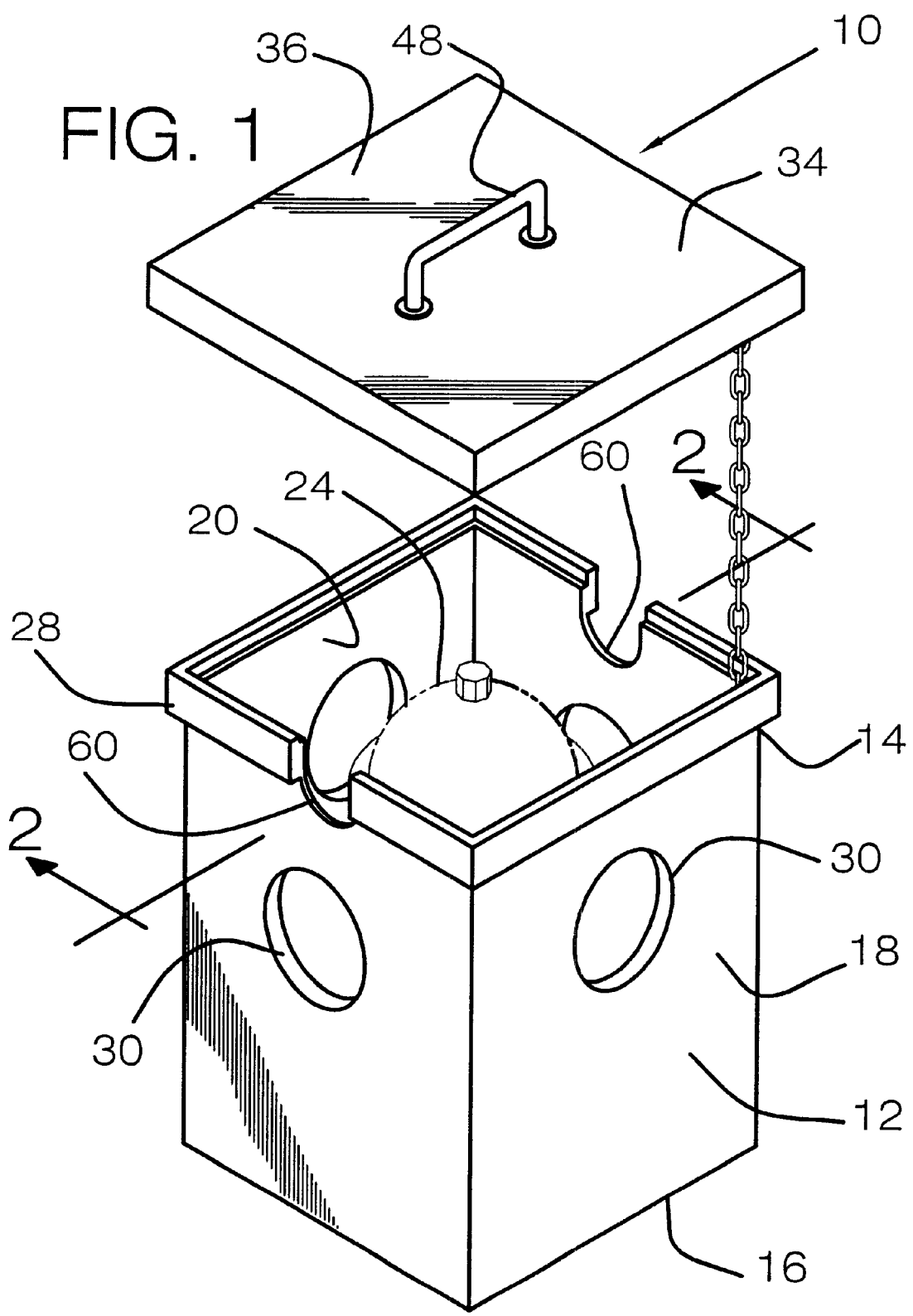

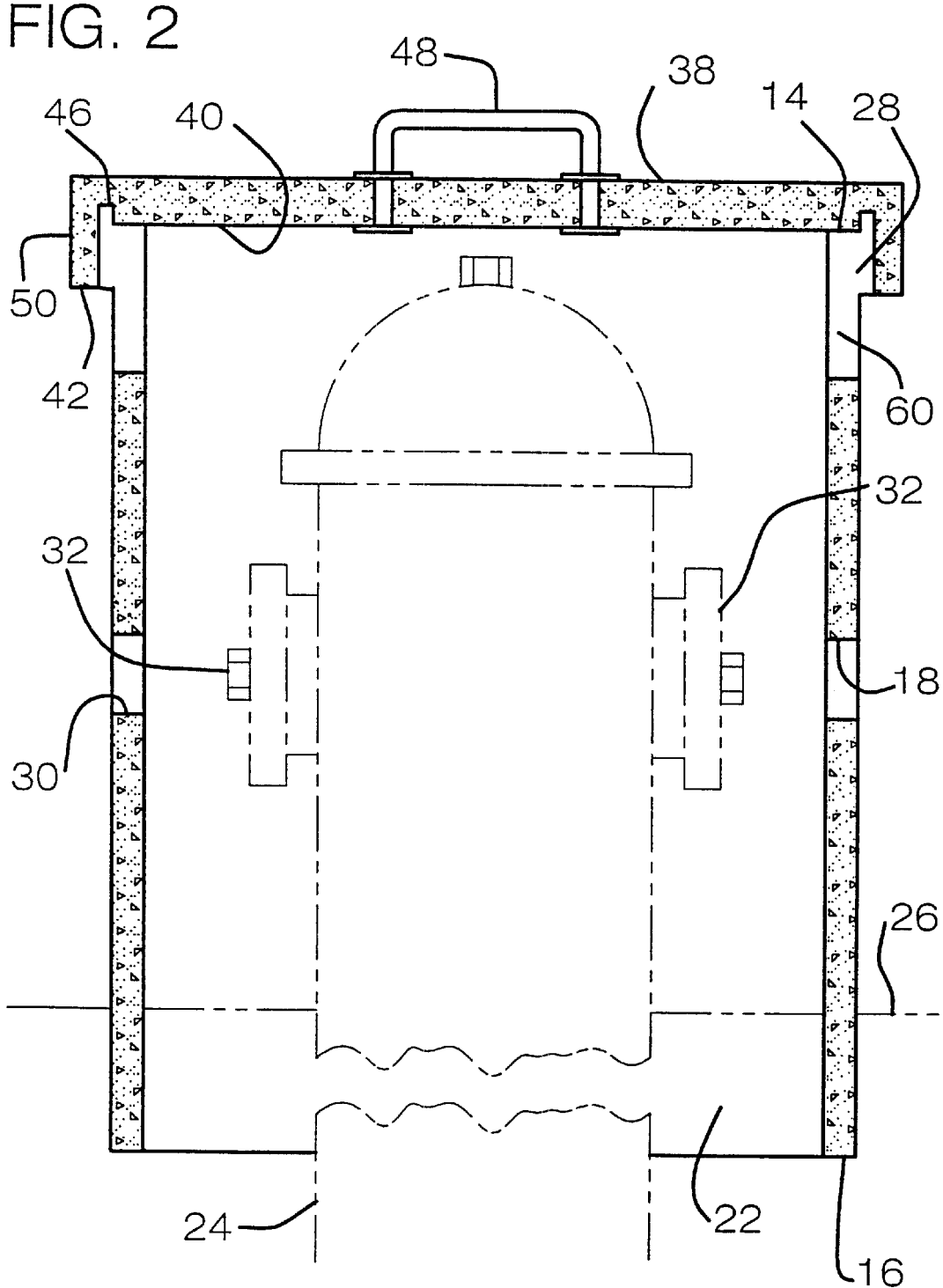

FIRE HYDRANT SAFETY BOX

BACKGROUND OF THE INVENTION

1. Field of the Invention

The present invention relates to fire hydrant safety boxes and more particularly pertains to a new fire hydrant safety box for providing a user with a product that could be used to surround and protect fire hydrants from physical damage.

2. Description of the Prior Art

The use of fire hydrant safety boxes is known in the prior art. U.S. Pat. No. 5,664,597 describes a device for covering the fire hydrant and locating the fire hydrant in the winter months. Another type of fire hydrant safety boxes is U.S. Pat. No. 4,556,080 having a pitched roof that is hingeably coupled to a base portion of the device.

While these devices fulfill their respective, particular objectives and requirements, the need remains for a device that is superior to the above-mentioned devices. The present invention has certain improved features such as the present invention is easy to use and is of simple and durable construction.

SUMMARY OF THE INVENTION

The present invention meets the needs presented above by consisting of simple non-mechanical parts. The present invention is also reinforced by concrete making it superior in strength compared to other devices.

Still yet another object of the present invention is to provide a new fire hydrant safety box that would durable and easy to install.

Even still another object of the present invention is to provide a new fire hydrant safety box that would provide superior protection to the hydrant.

To this, the present invention generally comprises a tubular member has an upper edge, a lower edge and a peripheral wall that extends between the upper and lower edge. The upper edge defines an upper opening and the lower edge defines a lower opening. The fire hydrant is extended through the lower opening such that the fire hydrant is within the tubular member. The lower edge extends into a ground surface for surrounding the fire hydrant.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new fire hydrant safety box according to the present invention.

FIG. 2 is a cross-sectional view of the present invention.

DESCRIPTION OF THE PREFERRED EMBODIMENT

With reference now to the drawings, and in particular to FIGS. 1 through 2 thereof, a new fire hydrant safety box embodying the principles and concepts of the present invention and generally designated by the reference numeral 10 will be described.

As best illustrated in FIGS. 1 through 2, the fire hydrant safety box 10 generally comprises a tubular member 12 that has an upper edge 14, a lower edge 16 and a peripheral wall 18 that extends between the upper 14 and lower edge 16. The upper edge 14 defines an upper opening 20 and the lower edge defines a lower opening 22. Wherein the fire hydrant 24 is extended through the lower opening 22 such that the fire hydrant 24 is within the tubular member 12. The lower edge 16 extends into a ground surface 26 for surrounding the fire hydrant 24. A lip 28 is attached to and extends around the peripheral wall 18. The lip 28 is adjacent to the upper edge 14 and extends upwardly beyond the upper edge 14. The peripheral wall 18 ideally comprises a concrete material, though other heavy and rigid material such as iron may also be used. The tubular member 12 has a generally rectangular shaped cross-section taken transversely to an axis extends through the upper 20 and lower openings 22. The peripheral wall 18 has a plurality of apertures 30 that extend therethrough. Each of the apertures 30 is generally alignable with one of a plurality of nozzles 32 positioned on the fire hydrant 24. The upper edge 14 of the peripheral wall ideally has a pair of oppositely positioned arcuate indentations 60 therein.

A cover 34 is positionable on the upper edge 14 for selectively opening and closing the upper opening 20, the cover 34 includes a plate 36 has top side 38, a bottom side 40 and a peripheral edge 42. The perimeter edge 50 has a length greater than a length extending around the peripheral wall 18. The cover 34 has a shape generally the same shape as the top edge. The perimeter edge 50 has a ridge 44 thereon for extending around the peripheral edge 42 and downward from the peripheral edge 42 such that the ridge 44 extends around an upper portion of the peripheral wall 18 adjacent to the upper edge 14. The bottom side 40 has a channel 46 therein extends around the cover 34 and positioned adjacent to the perimeter edge. The lip 28 is positionable in the channel 46. The cover 34 includes a concrete material. A handle 48 is positioned on and attached to the upper side of the cover 34.

In use, the present inventions reinforced concrete construction, combined with its ability to permit hydrants to be set deeper than would otherwise be possible, could help protect them against physical damage. Its captive concrete lid could also discourage tampering and vandalism. Its notched design would prevent it from interfering with the deployment of fire hoses. The present invention may also be constructed out of other heavy gage materials such as iron.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fire hydrant protection device for protecting a fire hydrant from a collision, said device comprising:

a tubular member having an upper edge, a lower edge and a peripheral wall extending between said upper and lower edge, said upper edge defining an upper opening and said lower edge defining a lower opening, wherein the fire hydrant is extended through said lower opening such that said fire hydrant is within said tubular member, said lower edge extending into a ground surface surrounding the fire hydrant; and wherein said peripheral wall has a plurality of apertures extending there through, each of said apertures being generally alignable with at least one nozzle positioned on the fire hydrant.

2. The fire hydrant protection device as in claim 1, wherein said tubular member has a generally rectangular shaped cross-section taken transversely to an axis extending through said upper and lower openings.

3. The fire hydrant protection device as in claim 1, wherein said peripheral wall comprises a concrete material.

4. The fire hydrant protection device as in claim 1, further including a cover being positionable on said upper edge for selectively opening and closing said upper opening, said cover comprising a plate having top side, a bottom side and a peripheral edge, said perimeter edge having a length greater than a length extending around said peripheral wall.

5. The fire hydrant protection device as in claim 4, wherein said peripheral edge has a ridge thereon extending around said peripheral edge and downward from said peripheral edge such that said ridge extends around an upper portion of said peripheral wall adjacent to said upper edge.

6. The fire hydrant protection device as in claim 4, wherein a lip is attached to and extends around said peripheral wall of said tubular member, said lip is adjacent to said upper edge and extending upwardly beyond said upper edge, said bottom side of said cover having a channel therein extending around said cover and positioned adjacent to said perimeter edge, said lip being positionable in said channel.

7. The fire hydrant protection device as in claim 4, further including a handle being positioned on and attached to said upper side of said cover.

8. The fire hydrant protection device as in claim 1, wherein said upper edge of said peripheral wall has a pair of oppositely positioned arcuate indentations therein.

9. A fire hydrant protection device for protecting a fire hydrant from a collision, said device comprising:

a tubular member having an upper edge, a lower edge and a peripheral wall extending between said upper and lower edge, said upper edge defining an upper opening and said lower edge defining a lower opening, wherein the fire hydrant is extended through said lower opening such that said fire hydrant is within said tubular member, said lower edge extending into a ground surface surrounding the fire hydrant, a lip being attached to and extending around said peripheral wall, said lip being adjacent to said upper edge and extending upwardly beyond said upper edge, said tubular member having a generally rectangular shaped cross-section taken transversely to an axis extending through said upper and lower openings, said peripheral wall having a plurality of apertures extending there through, each of said apertures being generally alignable with one of a plurality of nozzles positioned on the fire hydrant, said peripheral wall comprising a concrete material;

a cover being positionable on said upper edge for selectively opening and closing said upper opening, said cover comprising a plate having top side, a bottom side and a peripheral edge, said perimeter edge having a length greater than a length extending around said peripheral wall, said cover having a shape generally the same shape as said top edge, said peripheral edge having a ridge thereon extending around said peripheral edge and downward from said peripheral edge such that said ridge extends around an upper portion of said peripheral wall adjacent to said upper edge, said bottom side having a channel therein extending around said cover and positioned adjacent to said perimeter edge, said lip being positionable in said channel, said cover comprising a concrete material; and a handle being positioned on and attached to said upper side of said cover.

10. The fire hydrant protection device as in claim 9, wherein said upper edge of said peripheral wall has a pair of oppositely positioned arcuate indentations therein.

* * * * *